United States Patent

Bridges

[15] 3,637,959
[45] Jan. 25, 1972

[54] CIRCUIT DISCONNECT APPARATUS FOR OVERHEAD ELECTRIC LINES

[72] Inventor: Ronald P. Bridges, c/o Bridges Electric Inc., 2451 Wisconsin St., Downers Grove, Ill. 60515

[22] Filed: Oct. 22, 1970

[21] Appl. No.: 83,063

[52] U.S. Cl............................................................200/48
[51] Int. Cl.........................................H01h 31/00, H02b 5/02
[58] Field of Search..........................200/48; 335/35, 33, 34

[56] References Cited

UNITED STATES PATENTS

| | | |
|---|---|---|
| 2,712,577 | 7/1955 | Stene....................................200/48 X |
| 3,222,470 | 12/1965 | Pahl.......................................200/48 |
| 3,030,481 | 4/1962 | Gussow et al.......................200/48 X |

Primary Examiner—Robert K. Schaefer
Assistant Examiner—William J. Smith
Attorney—Hofgren, Wegner, Allen, Stellman & McCord

[57] ABSTRACT

Electric circuit disconnect apparatus for an overhead electric line carried on poles, including a line-mounted circuit disconnect means having a disconnect member pivoted on a horizontal axis to move its free end between an elevated closed position and a lower open position, and a crank and linkage system mounted on a pole for manually operating said disconnect means from ground level. Conveniently three disconnect means on three parallel electric lines are gang operated by a single crank and linkage mechanism.

25 Claims, 8 Drawing Figures

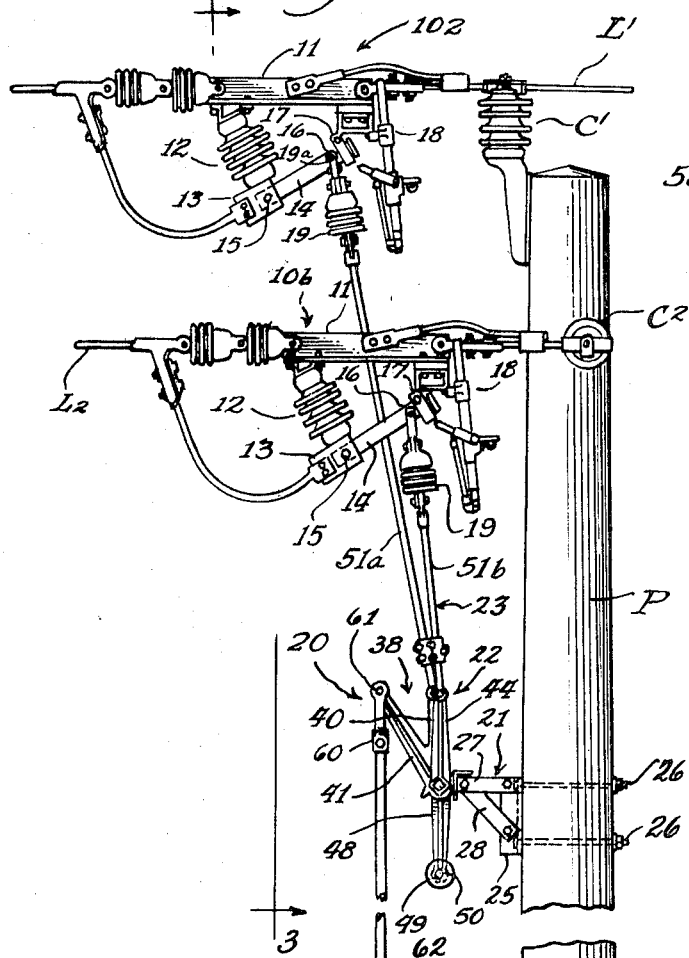
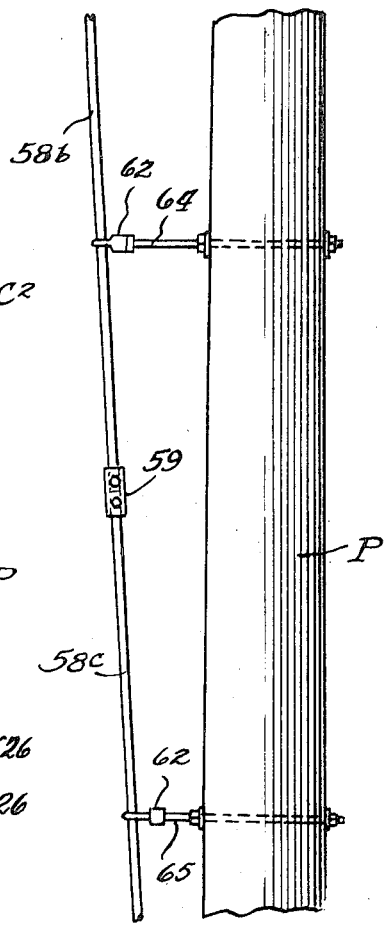
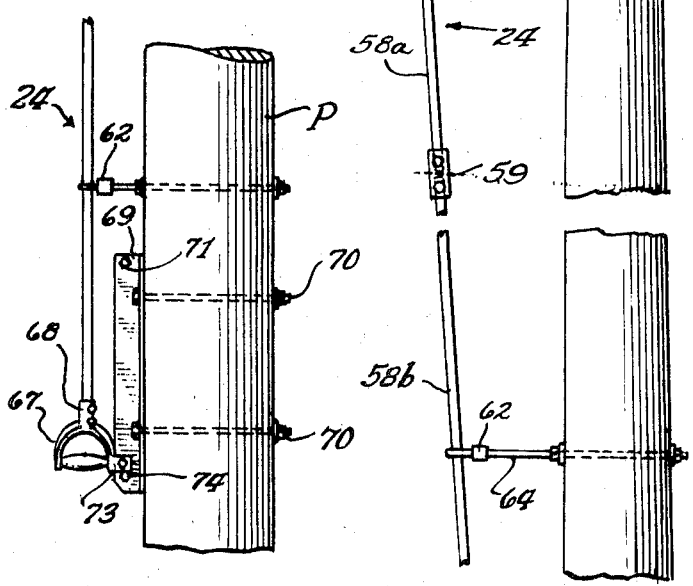
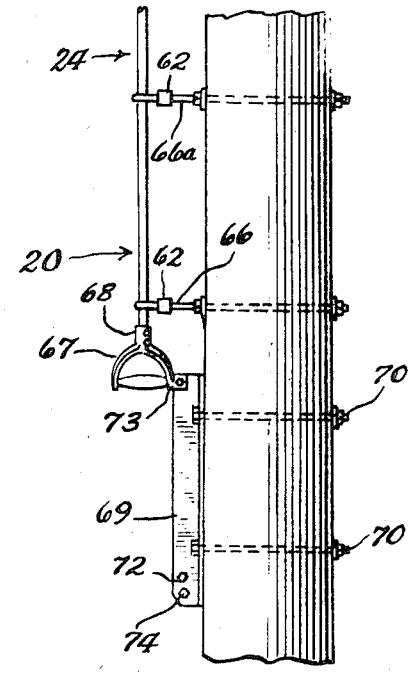
Fig. 1. Fig. 2. Fig. 2A.

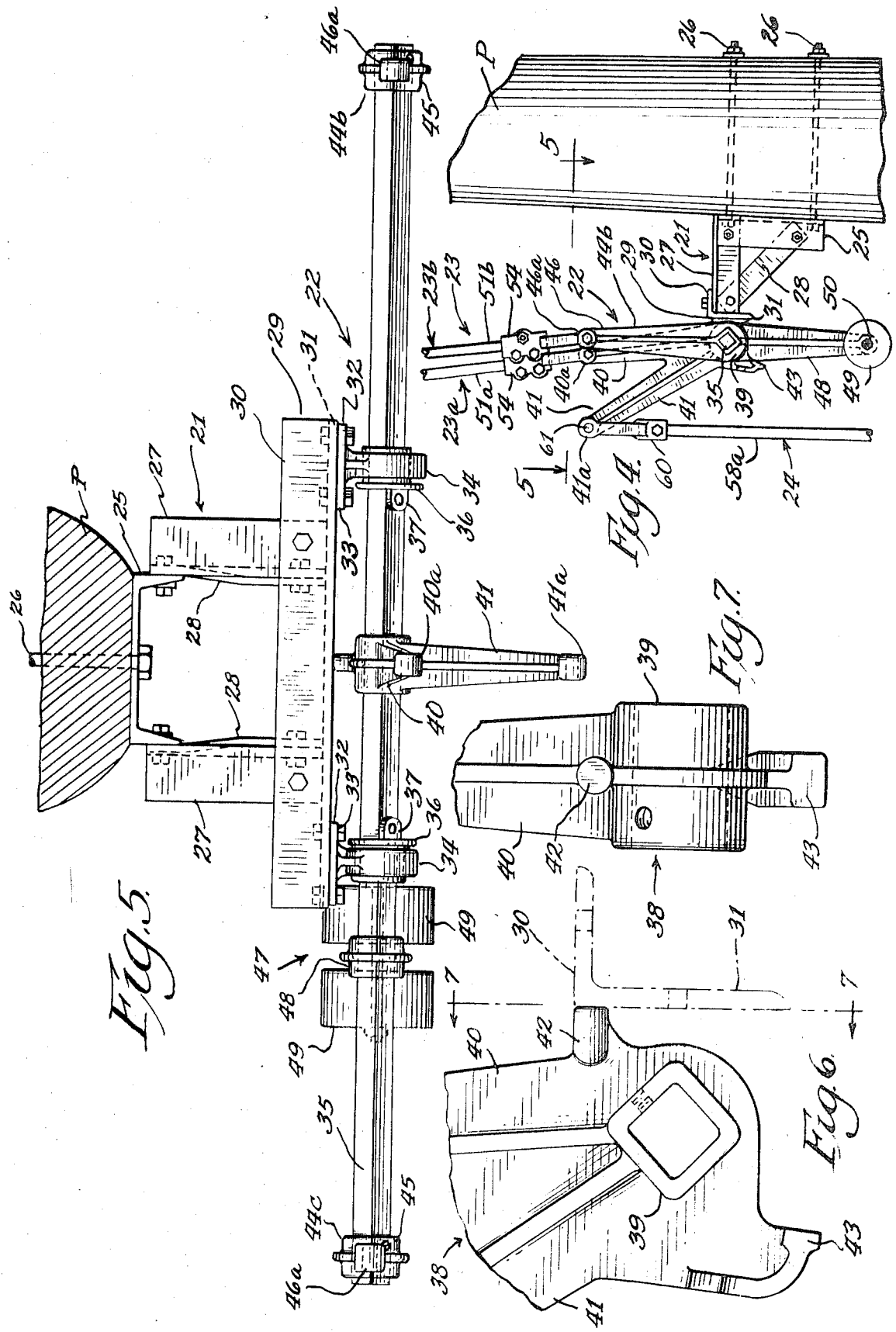

CIRCUIT DISCONNECT APPARATUS FOR OVERHEAD ELECTRIC LINES

BACKGROUND OF THE INVENTION

Overhead electric power distribution lines require circuit disconnect means at certain locations, and for low cost and simplicity of such circuit disconnect means they are desirably mounted in tension in the electric power distribution line instead of being mounted on a cross arm or pole top frame. In the past, line mounted circuit disconnect means have been opened or closed by the use of a hook stick; and if an overhead electric line is mounted upon a 40- or 50-foot pole the hook stick must either be so long as to be extremely clumsy and hazardous to use or else the service man must climb part of the way up the pole or else be hoisted up in a basket on a hydraulically operated boom arm. There is a need for a simple mechanism to open and close a line mounted circuit disconnect means from ground level without the use of an excessively long hook stick.

Furthermore, in most instances there are several parallel overhead electric power distribution lines all of which must be provided with circuit disconnect means, and in most instances if one such circuit disconnect means must be opened for the purpose of performing service on the line or on a branch line it is necessary to open all of them. Accordingly, simple, inexpensive, rugged and readily installed gang operating means for a plurality of such circuit disconnect means is required in most situations.

There are certain commercially available devices for opening circuit disconnect means of overhead electric power distribution lines from ground level, but they do not possess the advantages of the present structure. One type which uses a pull rod accessible from ground level to turn a rotatable member mounted near the top of the pole develops such high bearing pressure that operation becomes stiff with age and may become impossible.

Another type utilizes a vertical shaft which may be rotated by a handle at its lower end to operate a circuit disconnect switch at the top of the pole, and it also develops excessive bearing pressures and in addition is subject to other problems by reason of the fact that the vertical shaft must be journaled in several places where collection of dirt or ice or corrosion may make the shaft excessively hard to turn.

Furthermore, most of the circuit disconnect means for overhead electric power distribution lines carried on poles are mounted on pole crossarms or on pole top frames, and are of the type in which an insulator must be bodily rotated on a mounting spindle in order to move the circuit disconnect member between closed and open positions. Any such circuit disconnect means inherently requires large force to move it and is very susceptible to jamming by collection of dirt, by icing or by other factors which make it difficult to rotate the insulator.

Prior art structures which incorporate rotatable insulator means on a mounting spindle inherently are subject to high forces in the associated bearings. These forces develop because, typically, a short radius crank is utilized to actuate a relatively longer radius switch blade. If the switch blade, for example, is three times as long as the operating crank, the force applied at the free end of the crank to operate the switch arm will be at least three times the force required to disengage the switch arm from its associated contact means. A reaction force equal to the high force applied at the end of the crank arm must appear in the bearing supporting the spindle. Typically, additional forces in the support bearing will be present due to cantilever or eccentric loading. In such a typical three-phase gang-operated switch, additional bearings are utilized to support bellcrank means and an operating handle at the base of the pole. Because of the frictional forces present throughout the mechanism, it is common to provide a mechanical advantage at the operating handle of perhaps three to one or four to one, or even more. It will thus be appreciated that a strong man could develop forces in the various connecting links of the order of 1,000 pounds. Difficult operation of outdoor switching equipment is in fact a recognized problem.

SUMMARY OF THE INVENTION

While the apparatus for opening and closing a circuit disconnect means as disclosed in the present patent application is broadly applicable to various kinds of line-mounted circuit disconnect means and even to circuit disconnect means carried on crossarms or pole top frames, the operating apparatus is particularly adapted for use with circuit disconnect means of the type disclosed and claimed in Bridges U.S. Pat. No. 3,510,611, issued May 5, 1970. Where the circuit disconnect means of that patent has a pivoted blade provided with a latch mechanism that may be manipulated by means of a hook stick, the present invention utilizes a modification of that circuit disconnect means in which the switch blade has no latch but instead is held in an elevated, closed position by means of an overcenter toggle structure which is a part of the crank and linkage mechanism for opening and closing the circuit disconnect means.

For gang operation there is a single crankshaft that is provided with a plurality (commonly three) of driving arms which project upwardly in the closed position of the circuit disconnect means, and the free end of each driving arm is connected by means of an electrically insulating driving link means to the free end of the switch blade (hereinafter usually called the disconnect member).

A single operating arm for pivoting the crank is formed integrally with one of the driving arms and has a free end which is angularly separated from the free end of the driving arm relative to the pivot axis of the crankshaft. At the free end of the operating arm is means to apply force to the arm from below to pivot the crank and thereby cause the driving arms and associated driving link means to swing from their overcenter positions through a straight toggle position and to an open position in which the switch blades are pivoted to swing their free ends downwardly and thus break the circuits in the overhead lines.

The crankshaft may be mounted upon a bracket which is a substantial distance from the bottom of the pole and also a substantial distance below the circuit disconnect means and the power lines. While operating force may be applied to the free end of the operating arm by means of a hook stick if desired, the invention contemplates the use of an operating rod which extends downwardly along the side of the pole and has a handle at its lower end by means of which it may be manually moved endwise to pivot the crank. An angle member is mounted in a vertical position on the pole next to the operating rod handle, and provision is made for padlocking the operating handle to the angle either in the closed position or in the open position of the circuit disconnect means.

In order to reduce the required operating force to a minimum a counterweight arm is mounted on the crankshaft opposite to the driving arms. Furthermore, the driving arm which is formed integral with the operating arm is provided with a pair of stop bosses which limit the rotation of the crankshaft to approximately 100° by abutting with the bracket in both limit positions of the circuit disconnect means.

Since no mechanical advantage is provided at the operating handle of the present invention, it is apparent that a force of no more than perhaps 200 pounds can be present in the vertical operating shaft. While there is an extremely high mechanical advantage present due to the overtoggle action of the cranks, the forces in the support bearings of the crankshaft remain at quite nominal values. In fact, the total bearing lead is the difference between the force required to pull the switch blade out of the contact and the force applied by the switch operator. This force, in practice, is on the order of 50 pounds or less. A stroke of only approximately 1½ feet is required to fully operate the switch, whereas, prior art structures typically incorporate a handle 3 feet in length which must be moved through an arc of approximately 180°, so that the stroke is on the order of 6 feet. Since the force required to operate the switch of the present invention is usually equal or perhaps less than that required to operate prior art structures, it will be appreciated that a great deal less work is required to operate the switch. This is very convenient to the human operator and allows remote operating means of less power and thus of lower cost and more simple design.

Accordingly, the principal object of the present invention is to provide line-mounted circuit disconnect means which is provided with a crank and linkage system for manually operating the disconnect means from ground level.

A further object of the invention is to provide for gang operation of a plurality of line-mounted circuit disconnect means through a single crank and linkage mechanism which conveniently opens and closes three circuit disconnect means simultaneously.

Yet another object of the invention is to provide such apparatus which is inexpensive, of rugged and dependable construction, and easily installed in existing electric power distribution lines with but a few man-hours of labor. Actual field experience has demonstrated that three circuit disconnect means and their gang operating crank and linkage system may be mounted in an energized 12 kv. feeder circuit by a three man crew in approximately 2½ hours.

Another object of the invention is to provide overhead electric line disconnect apparatus which is manually operable from ground level by means of a linkage system in which the links are made of dielectric material.

DESCRIPTION OF THE DRAWINGS

FIG. 1 is a fragmentary side elevational view of the apparatus of the invention, showing the circuit disconnect means and crank and linkage system in a typical installation having three parallel overhead electric power distribution lines;

FIG. 2 is a fragmentary side elevational view which illustrates the lower portion of the operating rod and its guides and the operating handle in closed position, and which partially overlaps FIG. 1;

FIG. 2a is a fragmentary view similar to FIG. 2 illustrating the operating handle in open circuit position;

FIG. 4 is a fragmentary side elevational view illustrating the crank structure in more detail;

FIG. 5 is a top plan view of the crank structure, generally as viewed from the line 5—5 of FIG. 3 or FIG. 4;

FIG. 6 is a fragmentary side elevational view of the combined driving arm and operating arm with a portion of the mounting bracket shown in broken lines to illustrate the relationship between the stop lugs on the arm and the angle member; and FIG. 7 is a view of the arm of FIG. 6 taken substantially as indicated along the line 7—7 of FIG. 6.

DETAILED DESCRIPTION OF THE INVENTION

Figure 3:
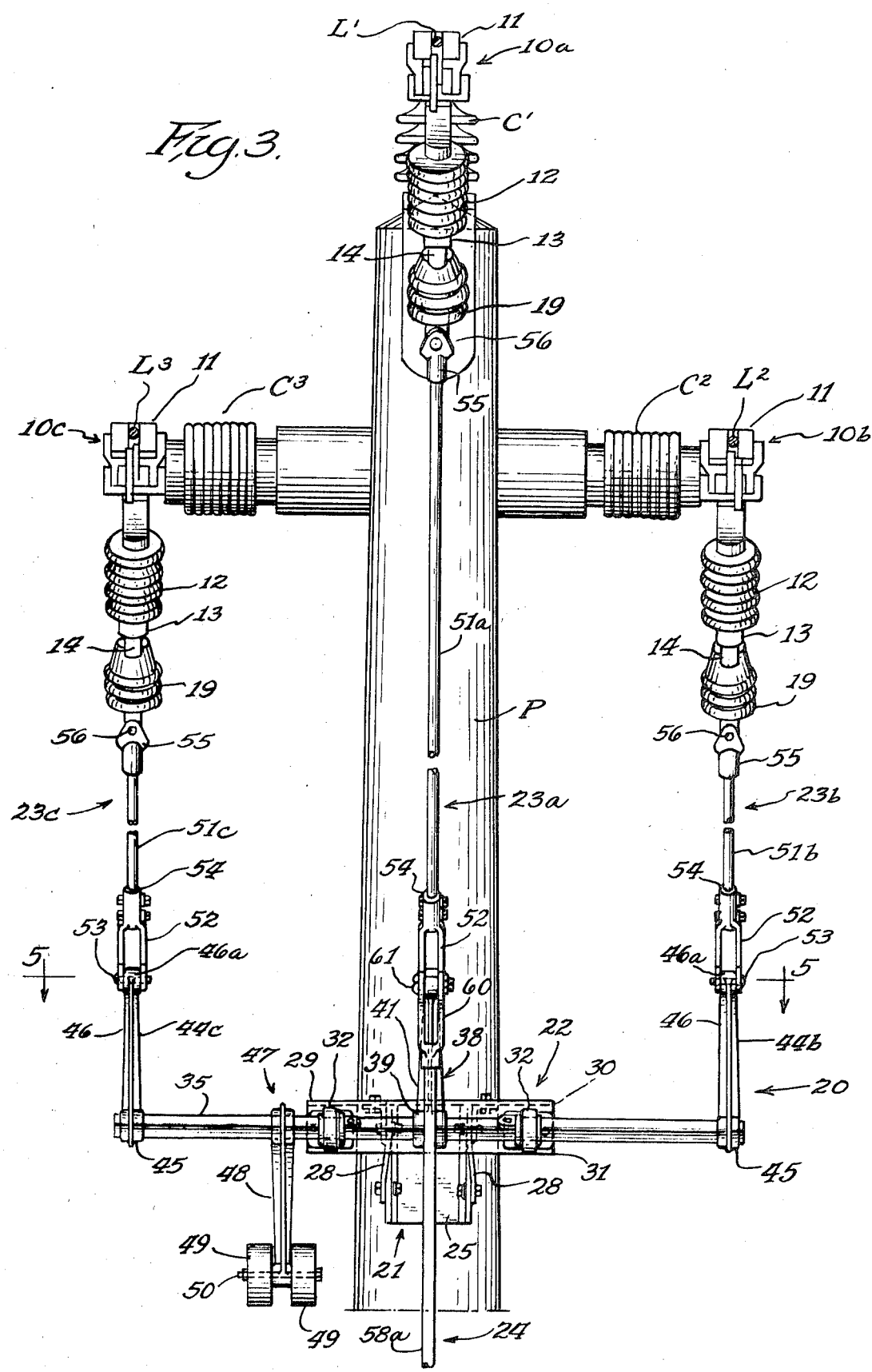
FIG. 3 is a transverse sectional view on an enlarged scale taken substantially as indicated along the line 3—3 of FIG. 1.

Referring to the drawings in detail, and referring first to FIGS. 1 to 3, three overhead electric powerlines L1, L2 and L3 are supported upon a pole P by means of ceramic line mounting insulators C1, C2 and C3 in the usual manner. Mounted in the powerlines L1, L2 and L3 in tension are three identical circuit disconnect means 10a in the line L1, 10b in the line L2 and 10c in the line L3.

Except in the one respect heretofore mentioned, and which will be described in more detail hereinafter, each of the three circuit disconnect means is constructed in accordance with the disclosure of FIG. 1 of U.S. Pat. No. 3,510,611 as modified by the structure of Bridges U.S. Pat. No. 3,514,560. Thus, each of the circuit disconnect means includes a base 11 mounted in the line in tension, a lightweight porcelain insulator 12 which has a pivot support 13 at its lower end, and a blade-type circuit disconnect member 14 which is pivoted at 15 on the pivot support and has a free end 16. In the closed position of the circuit disconnect means 10 illustrated in the drawings the free end 16 of the blade 14 is in circuit making engagement with an electric circuit element 17. Mounted on the circuit element 17 by the means disclosed and claimed in U.S. Pat. No 3,514,560 is a circuit interrupter member 18 which is constructed in accordance with the disclosure of Bridges U.S. Pat. No. 3,205,330.

As described up to this point each of the circuit disconnect means 10 is constructed precisely in accordance with the disclosure of FIG. 1 U.S. Pat. No. 3,510,611, except that the mounting for the interrupter member 18 is in accordance with U.S. Pat. No. 3,514,560. As previously stated, instead of a hook stick operated latch for maintaining the blade 14 with its free end 16 in its elevated closed position as in said patent, in the present apparatus the blade 14 is provided adjacent its free end 16 with an insulator 19 that is mounted on the blade by means of a pivot 19a on an axis parallel to the blade pivot axis 15. Each of the insulators 19 is functionally a part of a crank and link system, indicated generally at 20, by means of which the circuit disconnect means 10a, 10b and 10c may be gang operated.

The crank and link system 20 consists generally of a bracket, indicated generally at 21, a crank structure, indicated generally at 22, which cooperates with driving link means, indicated generally at 23, to open and close the circuit disconnect means 10a, 10b and 10c, and which may be operated from ground level by operating link means, indicated generally at 24.

Referring now particularly to FIGS. 3, 4 and 5, the bracket means 21 includes an upright support channel 25 which is secured to the post P by bolts 26 which impale the channel and the post and are secured by nuts, In a typical installation the upper one of the two bolts 26 is 4 feet below the centerlines of the insulators C2 and C3 which support the lines L2 and L3. A pair of angle members 27 extend outwardly from and are bolted to the upper end of the mounting channel 25 and diagonal braces 28 are bolted to the outer ends of the angle members 27 and adjacent the lower end of the mounting channel 25. A transverse angle member 29 has a horizontal mounting web 30 and a vertically depending supporting web 31 to which a pair of bearing blocks 32 are bolted to rotatably support the crank assembly 22.

As best seen in FIG. 5, each of the bearing blocks 32 includes a base 33 which is directly bolted to the flange 31, and an annular bearing member 34 on the base 33.

The crank assembly 22 is seen in FIGS. 3, 4 and 5 to include a square crankshaft 35 provided with a pair of fixed bushings 36 by means of which the crankshaft is journaled in the bearing blocks 34, the bushings 36 including locking fingers 37 to receive setscrews for locking the bushings against endwise movement on the crankshaft. As seen in FIG. 3, the end portions of the crankshaft 35 are in the same vertical plane with the powerlines L2 and L3 and with the centerlines of the insulators 19 which are functionally part of the outboard driving link means 23b and 23c, while the transverse median plane of the crankshaft 35 is in the plane of the line L1 and the insulator 19 which is on the circuit disconnect means 10a.

Fixedly mounted upon the crankshaft 35 on its transverse median plane is a double-armed member, indicated generally at 38, which includes a hub 39 by means of which it is mounted on the crankshaft 35, a driving arm 40 and an operating arm 41. The driving arm 40 has a free end 40a and the operating arm 41 has a free end 41a which are angularly spaced from one another with reference to the axis of the crankshaft 35. As best seen in FIGS. 6 and 7, an upper stop boss 42 and a lower stop boss 43 project from the area of the hub 39 and are positioned to bear upon the depending flange 31 of the angle member 29 to limit rotary motion of the crankshaft 35 to an angle of 100°, with the boss 42 abutting the angle member in closed position of the disconnect means and the boss 43 abutting the angle member in the open position of the disconnect means.

At the two end portions of the crankshaft 35 are fixedly mounted driving arms 44b and 44c which cooperate, respectively, with the link means 23b and 23c to operate the circuit disconnect means 10b and 10c while the driving arm 40 cooperates with the link means 23a to operate the circuit disconnect means 10a. Each of the driving arms 44b and 44c includes a hub portion 45 and an arm 46 which has a free end 46a. As seen in FIGS. 1 and 4, with the circuit disconnect means in their closed positions the arms 44b and 44c are vertical, while the arm 40 is very slightly inclined so that its free end 40a is not coaxial with the free ends 46a of the arms 44b and 44c. Nevertheless, the angular difference is so slight that all three of said driving arms extend upwardly from the crankshaft in the closed position of the circuit disconnect means.

Also mounted upon the crankshaft 35 is a counterweight assembly, indicated generally at 47, which includes a counterweight arm 48 that is like the driving arms 44b and 44c and that is seen in FIGS. 1, 4 and 5 to extend directly downwardly from the crankshaft 35 so as to be precisely opposite the driving arms 44b and 44c. A pair of counterweights 49 are mounted at the end of the counterweight arm 48 on a cross pin 50.

Turning now to the driving link means 23, the driving link means 23a, 23b and 23c are identical except for the fact that the driving link means 23a utilizes a link rod 51a which is seen in FIGS. 1 and 3 to be substantially longer than the link rods 51b and 51c of the link means 23b and 23c. In each case the link rod is made of fiberglass so as to provide a completely insulated link connection between the crank means 20 and the circuit disconnect means 10a, 10b and 10c. Each of the driving link means, in addition to the driving rod 51, includes a clamp clevis 52 which spans the outer end of the associated driving arm 40 or 44, as the case may be, and is pivotally connected thereto by a pin 53. Each of the clamp clevises 52 includes a split sleeve 54 to receive the lower end of the fiberglass driving rod 51, and the sleeves 54 are open at both ends so as to permit the lower ends of the driving rods to be adjusted in the sleeves to compensate for differences in the distances from the upper ends of the driving arms to the insulators 19 on the circuit disconnect means 10. As seen in FIG. 3, at the upper ends of the driving rods 51 are clevises 55 which are connected to the lower ends of the insulators 19 by pins 56 which are at right angles to the pins 53 so as to provide essentially rigid connections between the driving rods 51 and the insulators 19 in the planes of the driving arms 40, 44b and 44c.

As seen in FIG. 1, each driving arm 40, 44b and 44c, with its associated driving link means 23a, 23b or 23c, respectively, occupies an overcenter toggle position with respect to a line from the axis of the crankshaft 35 to the pivot axis 19a of each insulator 19, so as to retain the switch blades, or disconnect elements 14 in their elevated, closed positions as seen in the drawings.

Referring now particularly to FIGS. 1, 2 and 2a, the operating rod 24 in the particular apparatus illustrated consists of three lengths of fiberglass rod 58a, 58b and 58c which are connected together by couplers 59. The number of lengths of fiberglass rod used in the complete operating rod depends, of course, upon the height of the pole P; but in most instances the operating rod 24 is about 30 feet long and consists of three 10-foot lengths.

At the upper end of the rod section 58a is a clevis 60 which is best seen in FIGS. 3 and 4 to be pivotally connected by means of a bolt 61 and a nut to the free end of the operating arm 41.

A series of guide rings 62 is seen in FIGS. 1 and 2 to be supported on the pole by means of a series of bolts of progressively decreasing length so that the uppermost ring 62 is mounted by a bolt 63 substantially directly below the position occupied by the free end 41a of the operating arm 41 in the closed position of the circuit disconnect means, while the next lower guide ring 62 is mounted upon a shorter bolt 64, the next lower one upon a still shorter bolt 65, and the lowermost two rings upon identical bolts 66a and 66b. The guide rings 62 encircle the operating rod 24 at intervals of approximately 5 feet, so that the flexible rod may transmit upward pushing force to the operating arm 41 when it is necessary to move the disconnect means 10a, 10b and 10c from their open position to the closed position illustrated in the drawings.

At the bottom of the operating rod is a handle 67 which has a socket 68 in which the lower end of the rod length 58c is clamped and secured by setscrew means. A locking angle 69 is secured to the pole by bolts 70 and has an upper padlock hole 71 and a lower padlock hole 72 with each of which a bifurcated flange 73 on the handle is adapted to be registered so that the handle may be padlocked either in the closed switch position of FIG. 2 or the open switch position of FIG. 2a. A hex-headed bolt 74 mounted in the locking angle 69 serves as a lower stop for the handle 67 when the holes in the bifurcated flange 73 are aligned with the lower hole 72 in the locking angle.

The foregoing detailed description is given for clearness of understanding only and no unnecessary limitations should be understood therefrom as modifications will be obvious to those skilled in the art.

I claim:

1. Electric circuit disconnect apparatus for an overhead electric power distribution line carried on poles, said apparatus comprising, in combination:
   line-mounted circuit disconnect means which is supported on an overhead electric power distribution line adjacent a pole, said disconnect means including a disconnect member which is pivoted at one end for movement between a closed position in which its free end engages an electric circuit element and an open position in which its free end is spaced from said circuit element;
   a bracket mounted on said pole a substantial distance from the bottom of the pole and below said circuit disconnect means;
   a crank pivoted on said bracket on a horizontal axis, said crank having a driving arm which projects upwardly in the closed position of the disconnect member and having an operating arm, said arms having free ends which are angularly separated from one another relative to the pivot axis of the crank;
   driving link means which is pivoted to the free end of the driving arm and to the free end of the disconnect member on axes which are parallel to the axis of the crank, said driving link means providing an electrically insulating connection between the driving arm and the disconnect member;
   and means at the free end of the operating arm to apply force thereto to pivot the crank.

2. The apparatus of claim 1 in which the disconnect member is pivoted on a horizontal axis and its free end moves between an elevated closed position and a lower open position.

3. The apparatus of claim 2 in which the driving arm and the driving link means comprise toggle means which, in closed position, is slightly overcenter with respect to a line from the pivot axis of the crank to the pivotal connection between the driving link and the disconnect member.

4. The apparatus of claim 1 in which the driving link means includes an insulator pivotably mounted at the pivotal connection with the disconnect member.

5. The apparatus of claim 4 in which the driving link means includes a rod the lower end of which is provided with a clevis at the pivotal connection with the driving arm.

6. The apparatus of claim 5 in which the clevis is adjustable lengthwise on the rod.

7. The apparatus of claim 1 in which the driving link means includes a rod of dielectric material the lower end of which is provided with a clevis at the pivotal connection with the driving arm.

8. The apparatus of claim 7 in which the clevis is adjustable lengthwise on the rod.

9. The apparatus of claim 1 in which the means at the free end of the operating arm includes an operating rod pivotally connected thereto on an axis which is parallel to the axis of the crank, said operating rod extending downwardly from the operating arm in spaced relationship to the pole, a handle at the bottom of the operating rod for manually moving said rod endwise to pivot the crank, and means for selectively fastening said handle relative to the pole in each of said closed and open positions.

10. The apparatus of claim 9 in which the operating rod is flexible, and annular guide members are mounted on the pole at intervals and encircle said rod.

11. The apparatus of claim 10 in which the operating rod is dielectric material.

12. The apparatus of claim 10 in which the axis of the crank is a predetermined distance from the pole, the handle is a predetermined smaller distance from the pole, and the guide members are successively closer to the pole from top to bottom.

13. The apparatus of claim 12 in which there is an uppermost guide member that is substantially vertically aligned with the pivotal connection between the operating rod and the operating arm in closed position, and in which there are two guide members adjacent the handle-fastening means which are equidistant from the pole, so that the lowermost portion of the rod and the handle move vertically between closed and open positions.

14. The apparatus of claim 1 in which the crank is provided with a counterweight opposite the driving arm.

15. The apparatus of claim 1 in which the crank is provided with first and second angularly separated stop bosses one of which abuts the bracket in each of the closed and open positions.

16. Gang-operated electric circuit disconnect apparatus for a plurality of adjacent effectively parallel overhead electric power distribution lines carried on poles, said apparatus comprising, in combination:
   a separate line-mounted circuit disconnect means supported on each of said overhead electric power distribution lines adjacent a pole, each said disconnect means including a disconnect member which is pivoted at one end for movement between a closed position in which its free end engages an electric circuit element, and an open position in which its free end is spaced from said circuit element;
   a bracket mounted on said pole a substantial distance from the bottom of the pole and below said circuit disconnect means;
   an elongated crankshaft journaled on said bracket on a horizontal axis;
   a plurality of parallel driving arms fixed on said crankshaft each of which has a free end substantially directly beneath the free end of one of the disconnect members and each of which projects upwardly in the closed position of said members;
   an operating arm fixed on the crankshaft which has a free end that is angularly separated from the free ends of the driving arms relative to the axis of the crankshaft;
   a plurality of separate driving link means each of which is pivoted to the free end of one of the driving arms and to the free end of one of the disconnect members on axes which are parallel to the axis of the crankshaft, each said driving link means providing an electrically insulating connection between the associated driving arm and associated disconnect member;
   and means at the free end of the operating arm to apply force thereto to pivot the crankshaft.

17. The apparatus of claim 16 in which there are spaced bearing blocks on the bracket, the crankshaft is rectangular in cross section and is provided with journals by which it is rotatably mounted in the bearing blocks, and in which the operating arms are separate from the crankshaft and have rectangular openings snugly impaled by the crankshaft.

18. The apparatus of claim 17 in which the operating arm is integral with one of the driving arms.

19. The apparatus of claim 16 in which each disconnect member is pivoted on a horizontal axis and its free end moves between an elevated closed position and a lower open position, 20. The apparatus of claim 19 in which each driving arm and associated driving link means comprises toggle means which, in closed position, is slightly overcenter with respect to a line from the pivot axis of the crank to the pivotal connection between the driving link and the associated disconnect member.

21. The apparatus of claim 16 in which the means at the free end of the operating arm includes an operating rod pivotally connected thereto on an axis which is parallel to the axis of the crank, said operating rod extending downwardly from the operating arm in spaced relationship to the pole, a handle at the bottom of the operating rod for manually moving said rod endwise to pivot the crank, and means for selectively fastening said handle relative to the pole in each of said closed and open positions.

22. The apparatus of claim 16 in which there is a counterweight arm on the crankshaft substantially opposite the driving arms, and a counterweight at the end of the counterweight arm.

23. The apparatus of claim 16 in which one of the arms is provided with first and second angularly separated stop bosses one of which abuts the bracket in each of the closed and open positions.

24. The apparatus of claim 23 in which the arms are separate from the crankshaft and are nonrotatably mounted thereon, in which the operating arm is integral with one of the driving arms, and in which the stop bosses are on said one of the driving arms.

25. Electric circuit disconnect apparatus for an overhead electric power distribution line carried on poles, said apparatus comprising, in combination:
   circuit disconnect means which is electrically a part of an overhead electric power distribution line, said disconnect means being supported a predetermined distance from the upright part of a line carrying pole, and said disconnect means including a disconnect member which is pivoted at one end for movement between a closed position in which its free end engages an electric circuit element and an open position in which its free end is spaced from said circuit element;
   a bracket mounted on said pole a substantial distance from the bottom of the pole and below said circuit disconnect means;
   a crank pivoted on said bracket on a horizontal axis, said crank having a driving arm which projects upwardly in the closed position of the disconnect member and having an operating arm, said arms having free ends which are angularly separated from one another relative to the pivot axis of the crank;
   driving link means which is pivoted to the free end of the driving arm and to the free end of the disconnect member on axes which are parallel to the axis of the crank, said driving link means providing an electrically insulating connection between the driving arm and the disconnect member;
   and means at the free end of the operating arm to apply force thereto to pivot the crank.

* * * * *